Dec. 4, 1928.
J. A. ARENZ
1,694,303
SCREW POINTING AND THREADING MACHINE
Filed Dec. 14, 1925
3 Sheets-Sheet 1
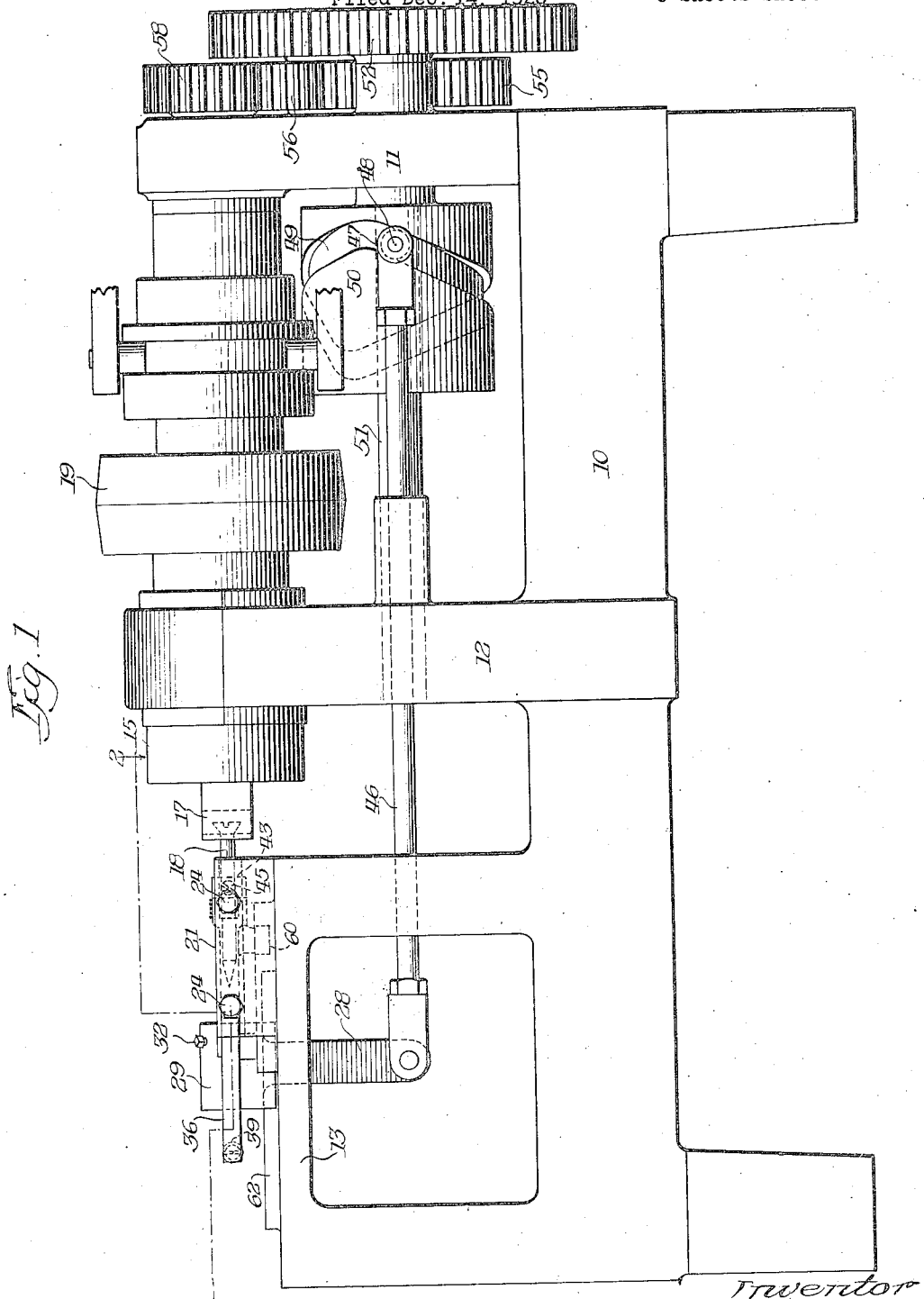

Dec. 4, 1928.  J. A. ARENZ  1,694,303
SCREW POINTING AND THREADING MACHINE
Filed Dec. 14, 1925  3 Sheets-Sheet 2
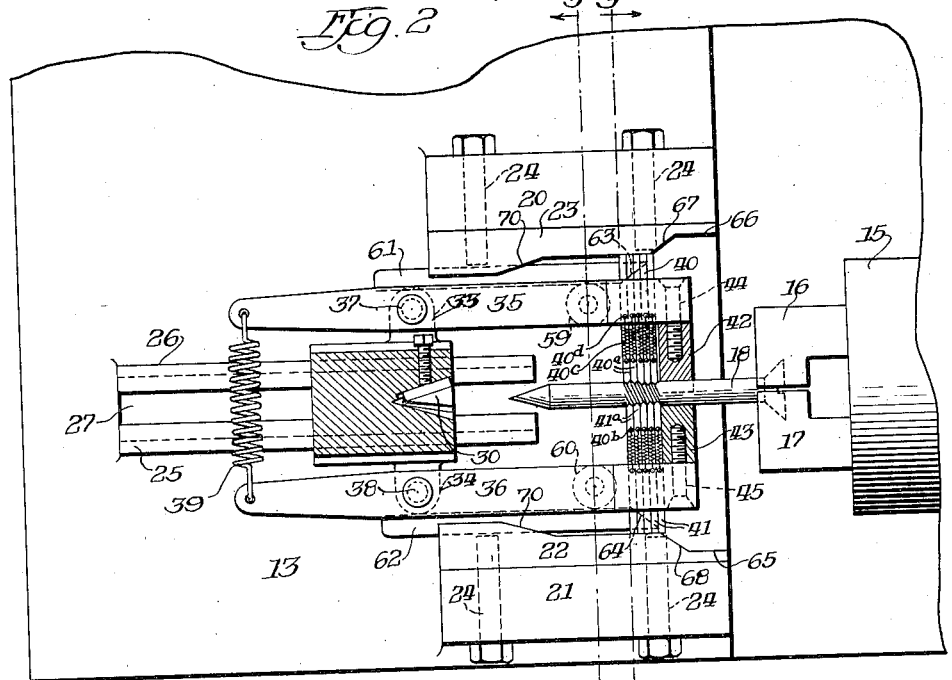
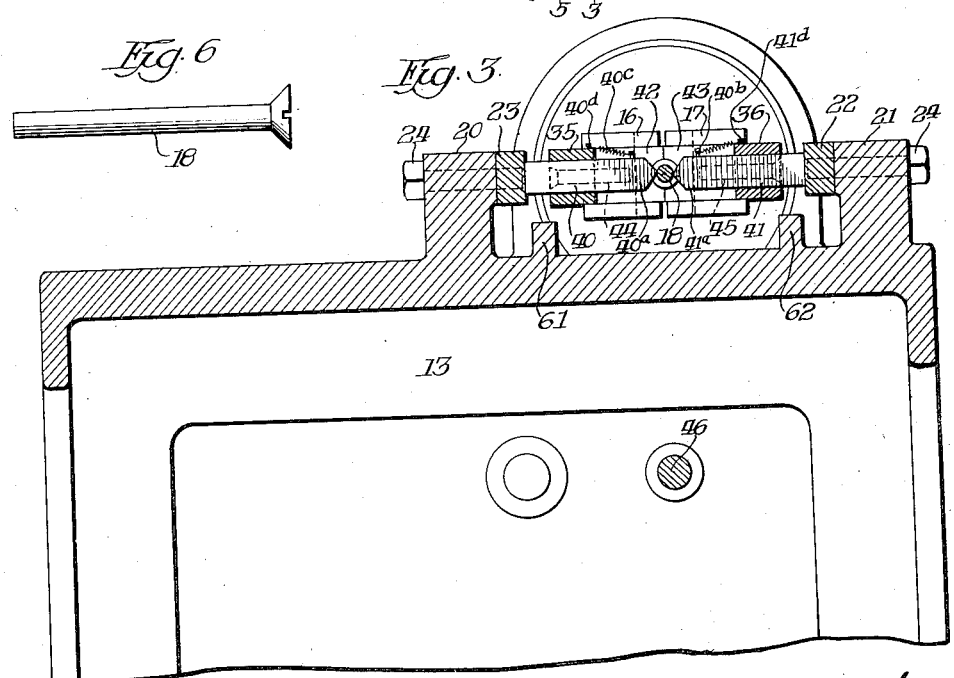
Inventor
John A. Arenz Dec. 4, 1928.

J. A. ARENZ 1,694,303

SCREW POINTING AND THREADING MACHINE

Filed Dec. 14, 1925   3 Sheets-Sheet 3

Inventor
John A. Arenz

Patented Dec. 4, 1928.

1,694,303

UNITED STATES PATENT OFFICE.

JOHN A. ARENZ, OF CHICAGO, ILLINOIS, ASSIGNOR TO INTERNATIONAL SCREW COMPANY, OF WILMINGTON, DELAWARE, A CORPORATION OF DELAWARE.

SCREW POINTING AND THREADING MACHINE.

Application filed December 14, 1925. Serial No. 75,199.

My invention relates to a machine for pointing and threading screws, the pointing operation being performed as the threading dies are advanced over the body of the screw, both the pointing and threading operations being performed in a single operation while the screw blank is held in the threading machine.

The primary object of my invention is the provision of a machine for cutting threads on a screw and which is adapted to complete the threading of the screw in a single operation by a plurality of cutting dies as distinguished from the tracer method which is now commonly employed in screw threading machines and wherein the cutting tool makes a plurality of trips from the head towards the point of the screw, cutting and shaving out the metal with each trip and continuing this operation until the thread is formed on the screw.

In my improved machine I place a plurality of dies in a holder, the first one of which takes a slight cut out of the body of the screw and each die being set in stepped relation with the one immediately preceding it, so that when the dies pass over the body of the screw at one trip the thread cutting operation is complete and the screw is dropped out of the machine and a new blank fed in which is pointed and threaded in approximately one-tenth the time that is now required for cutting threads of this type.

Another and further object of my invention is the provision of a threading machine which is simple and efficient in operation, which is cheap to manufacture and which is composed of a minimum number of parts so that its efficiency in operation is very materially increased.

These and other objects of my invention will be more fully and better understood by reference to the accompanying sheets of drawings and in which:—

Figure 1 is a side elevational view of my improved machine;

Figure 2 is a plan view on lines 2—2 of Figure 1;

Figure 3 is a cross sectional view on lines 3—3 of Figure 2;

Figure 6 is an elevational view of a screw blank before the pointing and threading thereof.

Figure 4:
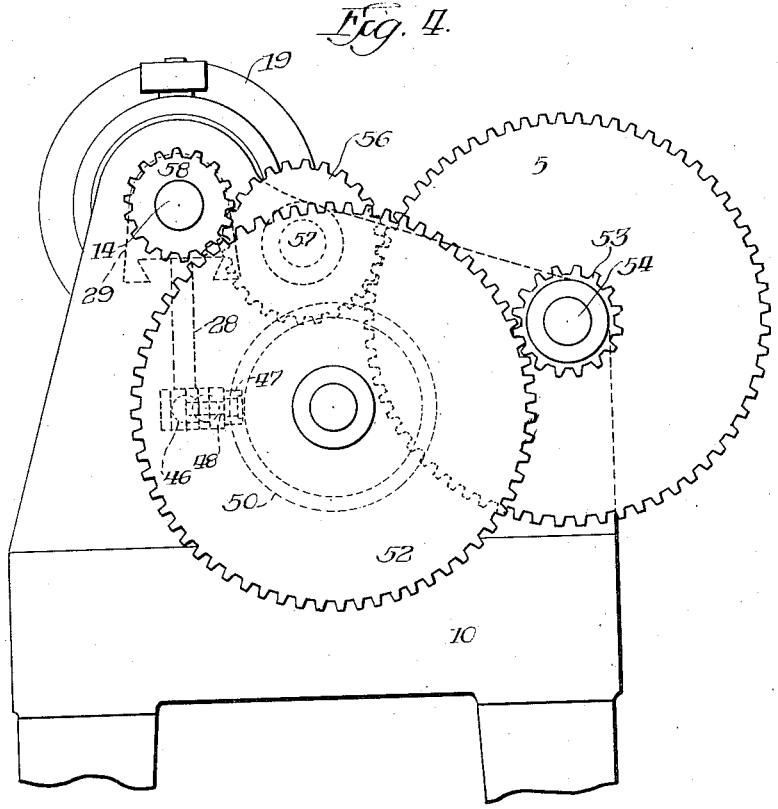
Figure 4 is an end elevational view of the gearing used in operating the machine.
Figure 5:
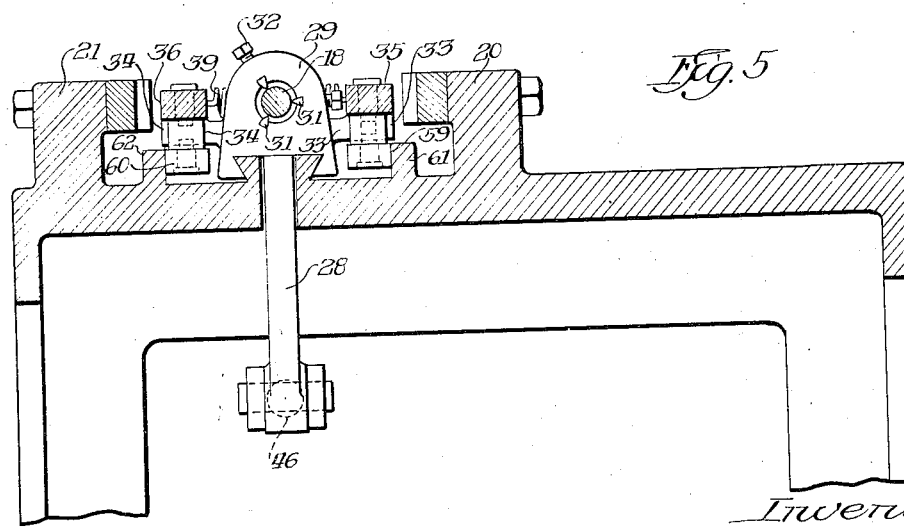
Figure 5 is a cross sectional view on lines 5—5 of Figure 2.

Referring now specifically to the drawings and in which like reference characters refer to like parts throughout, a machine frame 10 is shown having a pair of upwardly extending and integrally formed bracket portions 11 and 12 therein and having a table portion 13 formed therewith carrying the operating parts as hereinafter described. Mounted on the upper ends of the brackets 11 and 12 is a drive shaft 14 having a mandrel 15 mounted thereon in any suitable manner with a gripping mechanism composed of a pair of jaws 16 and 17 which are adapted to grip the screw 18 at the head thereof during the threading operation, the screw blanks being fed to the gripping members 16 and 17 in a manner common to machines of this type and which form no part of my present invention. A driving pulley 19 is provided which is mounted upon the shaft 14 and from which a belt leads to any suitable source of power which serves to rotate the screw blank 18 during the threading and pointing operations.

Projecting upwardly from the bed 13 is a pair of guides 20 and 21 having a pair of die guides 22 and 23 secured thereto by means of bolts 24, 24, the inner faces of the die guides 22 and 23 being parallel with each other at different points of their faces, but having angularly disposed surfaces at two points thereof as will be noted in Figure 2, for the purpose of bringing the dies into contact with the screw blank and holding them in position during the threading operation, as will be more fully described hereinafter. Also integrally formed with the bed 13 is a pair of guideways 25 and 26, these guideways being keystone shaped in formation and having a slot 27 extending therebetween through which an arm 28 extends, the said arm 28 having a head 29 on the upper end thereof which is mounted over the guideways 25 and 26, the head 29 having a recess 30 in one end thereof within which a plurality of cutters 31, 31 are mounted by means of a screw 32, these cutters performing the function of pointing the screw blank as it is revolved in the mandrel 15. Mounted on the head 29 and extending outward therefrom is a pair of arms 33 and 34 having a pair of pivotally mounted arms thereon 35 and 36 by means of pins 37 and 38 extending through the said arms, the said arms 35 and 36 being connected at their outer ends by a spring 39. The arms 35 and 36 at their opposite ends have two sets of oppositely projecting inwardly extending cutting dies 40 and 41 mounted therein, each set of cutting dies being comprised of a plurality of individual die blades 40$^a$ and 41$^a$, each die blade having a pin 40$^b$ mounted therein to which a tension spring 40$^c$ is secured at one of its ends and is secured to pins 40$^d$ mounted in the arms 35 and 36, these springs serving to hold the cutting dies outward against the sides of the guideways, the combined force of the small springs 40$^c$ being in excess of the force exerted by the spring 39 at the outer ends of the arms 35 and 36, and also have a pair of members 42 and 43 secured to the arms by means of screws 44 and 45, each of these members having semi-circular openings therein adjacent to the screw 18 so that they form a guide for the screw 18.

Mounted upon the lower end of the arm 28 is a rod 46 which has a roller 47 at one end thereof carried upon a pin 48, the roller 47 traveling in a guideway 49 formed on the outer periphery of the wheel 50 which is mounted upon a shaft 51 with a gear wheel 52 at the outer end thereof which meshes with a second gear 53 mounted upon a shaft 54 and secured to a large gear wheel 55 which in turn meshes with a smaller gear wheel 56 mounted upon a short shaft 57 which is in turn in mesh with a gear wheel 58 carried at the outer end of the shaft 14 and operated by the power wheel 19 so that the member 50 is rotated, the gearing, of course serving to reduce the speed very materially as compared with the rotation of the shaft 14, so that as the roller travels in the cam 49 the pointer 29 and arms 35 and 36 carrying the dies 40 and 41 are reciprocated on the guides 25 and 26. On the under side of the members 35 and 36 is mounted a pair of rollers 59 and 60, these rollers contacting with a pair of upstanding guide members 61 and 62 formed integrally with the work bed 13 on the frame 10, these members having inclined ends 63 and 64 so that in the operation of the device the spring 39 separates the guide members 42 and 43 and also the cutting members 40 and 41 for the insertion of the screw blank between these guides and into the mandrel 15.

In operation of the device the screw blank is fed into the machine by the same feeding mechanism as is now used in feeding screws into a machine of this type, the jaws 16 and 17 being opened so that the screw head is placed between these jaws which grip the head of the screw 18 and hold it during the pointing and threading operations. When the screw 18 is inserted in the mandrel 15 by the automatic feeding device, the pointer 29 is advancing towards the mandrel 15 and the arms 35 and 36 are also being carried towards the mandrel 15 with the outer ends of the cutting dies 40 and 41 in engagement with the flat surfaces 65 and 66 of the guides 22 and 23. The head continues to advance, the point of the screw entering the pointing head 29 where the screw blank is pointed by the cutters 31, 31 carried by the pointing head 29. Thereafter the cutting head is moved backward drawing the cutting dies 40 and 41 along with it along the inclined parts 67 and 68 of the members 22 and 23, the rollers 59 and 60 also engaging on the inclined ends of the guides 61 and 62 so that the cutting dies are brought into engagement with the outer periphery with the screw 18 which is being rotated rapidly by the mandrel 15 and cuts the threads on the screw blank as illustrated in Figure 2. As the cutting dies 40 and 41 are drawn along the surface of the screw the outer ends thereof come in contact with the parallel surfaces of the guides thereby forming the threads on the body of the screw and thence contact with the further inclined surfaces 70 on the members 22 and 23 thus causing the dies to conform to the outer contour of the point of the screw 18 and forming the threads down to the extreme point of the screw 18 such as described in my co-pending application Serial No. 12,457, filed March 22, 1925. When the threading operation is completed the jaws 16 and 17 of the mandrel 15 open up and the screw after it has been pointed and threaded is dropped from the mandrel and a new screw blank is inserted as the cutting head and threading elements are returned toward the mandrel by the action of the cam wheel 50 and the cycle of operation described above is again repeated.

It will thus be understood that the pointing and threading of the screw blank is performed in one single operation, the pointing being performed first and the threading afterwards at one single operation instead of in a plurality of operations as is now the practise and the production therefore, is from five to seven times faster than what it takes to thread a screw in following the tracer method which is the one now commonly employed.

While I have described more or less precisely the details of construction of my invention, I do not wish to be understood as limiting myself thereto, as I contemplate changes in form and the proportion of parts and the substitution of equivalents as circumstances may suggest or render expedient, without departing from the spirit or scope of my invention.

I claim:

1. In a screw pointing and threading machine, a frame, guides mounted on said frame, a pair of tool holding arms slidably arranged in said guides, a slotted pointing head having cutters mounted therein and secured on either side to said arms respectively and reciprocating with said arms, thread cutting dies in groups slidably mounted in said arms at the inner ends thereof and spring-held, fixed cam plates engaging said dies and moving them to their engagement with the screw, a tension spring drawing on the outer ends of said arms, means for reciprocating said tool holding arms, and means for holding and rotating the screw in coaction with the pointing and threading tools respectively.

2. In a screw pointing and threading machine, a frame, guides mounted on said frame, a pair of tool holding arms carrying the pointing and threading cutters and moving inwardly for the pointing and outwardly for the threading of the screw blank, a pointing head travelling with said arms to and from the screw and having cutters mounted therein, thread cutting dies in groups slidably mounted in said arms at the inner end thereof and spring-held, fixed cam plates engaging said dies and moving them to their engagement with the screw, a tension spring drawing on the outer ends of said arms, means for reciprocating said tool holding arms, and means for holding and rotating the screw in coaction with the pointing and threading tools respectively.

3. In a screw pointing and threading machine, a frame, guides mounted on said frame, a pair of tool holding arms slidably arranged in said arms, a slotted pointing head having cutters mounted therein and secured on either side to said arms respectively and reciprocating with said arms, thread cutting dies grouped to engage the screw blank at different depths of cuts, and sliding in said arms, individual springs from said dies respectively to said arms respectively and engaging the blanks on opposite sides, fixed cam plates engaging said dies and moving them to their engagement with the screw, a tension spring drawing on the outer ends of said arms, means for reciprocating said tool holding arms, and means for holding and rotating the screw in coaction with the pointing and threading tools respectively.

4. In a screw pointing and threading machine, a frame, guides mounted on said frame, a pair of tool holding arms slidably arranged in said arms, a slotted pointing head having cutters mounted therein and secured on either side to said arms respectively and reciprocating with said arms, thread cutting dies in groups slidably mounted in said arms at the inner ends thereof and spring-held, fixed cam plates secured to said guides and having inclined steps adapted to hold said dies clear on the inward stroke of said arms and to bring said dies into cutting engagement with the screw blank on the outer stroke and with the tapered portion of said stem, a tension spring drawing on the outer ends of said arms, means for reciprocating said tool holding arms, and means for holding and rotating the screw in coaction with the pointing and threading tools respectively.

5. In a screw pointing and threading machine, a frame, guides mounted on said frame, a pair of tool holding arms slidably arranged in said arms, a slotted pointing head having cutters mounted therein and secured on either side to said arms respectively and reciprocating with said arms, thread cutting dies in groups slidably mounted in said arms at the inner ends thereof and spring-held, fixed cam plates engaging said dies and moving them to their engagement with the screw, a tension spring drawing on the outer ends of said arms, parallel guides for said pointing head, a gear operated cam wheel, a connecting rod operatively connected to said cam wheel and to said pointing head, a gear operated shaft timed in respect to the operation of said pointing head, and a blank chuck mounted on said shaft and engaging the head of the screw blank and rotating the same.

6. In a screw pointing and threading machine, the combination with means for rotating a screw blank, of a reciprocating head provided at the front with cutting means for pointing the screw blank, arms pivotally mounted on the reciprocating head at opposite sides thereof and extending in advance of the same, transversely movable threading dies carried by arms and arranged to engage the screw blank at opposite sides thereof, said dies being located in spaced relation with the head whereby the blank may be pointed when the head moves in one direction and threaded when the head moves in the opposite direction, and means located in the path of the threading dies for moving the same into engagement with the screw blank.

7. In a screw pointing and threading machine, the combination with means for rotating a screw blank, of a reciprocating head provided with cutting means for pointing the screw blank and arranged to be carried into engagement with the screw blank by the forward movement of the reciprocating head, arms pivotally mounted on the head and extending to points in advance of the same at opposite sides of the screw blank, separate sets of threading dies carried by the pivoted arms and arranged to engage the screw blank at opposite sides thereof during the rearward movement of the reciprocating head, and means located in the path of the threading dies and arranged to move the same into engagement with the screw blank during the said backward movement of the reciprocating head and after the pointing means thereof has been carried out of engagement with the screw blank.

8. In a screw pointing and threading machine, the combination with means for rotating a screw blank, of a reciprocating head movable toward and from the said rotating means and provided with cutting means for pointing the screw blank, pivoted arms carried by the said head in the reciprocation thereof and extending in advance of the same at opposite sides of the screw blank, transversely movable sets of threading dies mounted on the said arms and adapted to engage the screw blank during the rearward movement of the reciprocating head after the pointing means has been carried out of engagement with the screw blank, and individual means yieldably connected with the threading dies of each set and with the said arms and adapted to permit the threading dies to successively be engaged with the screw blank, and means located in the path of the threading dies and arranged for moving the same into engagement with the screw blank during the rearward movement of the reciprocating head after the pointing means has been carried out of engagement with the screw blank.

9. In a screw pointing and threading machine, the combination with means for rotating a screw blank, of a reciprocating head movable toward and from the rotating means and provided with pointing means arranged to engage and point the screw blank during the forward movement of the reciprocating head, arms pivotally mounted on the reciprocating head and carried by the same, said arms extending to points at opposite sides of the screw blank, separate sets of threading dies mounted on the pivoted arms and slidable transversely thereof to engage and disengage the screw blank, individual springs connected with the pivoted arms and with the separate dies of each set and adapted to permit the same to be successively carried into engagement with the screw blank, and guides located at opposite sides of the screw blank and having angularly related portions arranged to move the threading dies into engagement with the screw blank during the backward movement of the reciprocating head after the pointing means has been carried out of engagement with the screw blank.

10. In a screw pointing and threading machine, the combination with means for rotating a screw blank, of a reciprocating head movable toward and from the rotating means and provided with means arranged to engage the screw blank during the forward movement of the head for pointing the said blank, levers pivotally mounted on the head at opposite sides thereof and extending in advance and in rear of the same and located at opposite sides of the screw blank, yieldable means connected with the rear arms of the levers for urging the same outwardly, separate sets of threading dies carried by the front arms of the levers and movable transversely into and out of engagement with the screw blank, means for moving the individual threading dies successively into engagement with the screw blank during the backward movement of the reciprocating head, and individual springs connecting each of the threading dies with the arm on which it is mounted.

Signed at Chicago, Illinois, this 11th day of December, 1925.

JOHN A. ARENZ.